US008488481B2

(12) United States Patent
Lin

(10) Patent No.: US 8,488,481 B2
(45) Date of Patent: Jul. 16, 2013

(54) SYSTEM RELIABILITY EVALUATION METHOD FOR TRANSMISSION BY TWO MINIMAL PATHS IN TIME RESTRICTION

(75) Inventor: Yi-Kuei Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 834 days.

(21) Appl. No.: 12/656,575

(22) Filed: Feb. 4, 2010

(65) Prior Publication Data

US 2011/0007642 A1    Jan. 13, 2011

(30) Foreign Application Priority Data

Jul. 10, 2009   (TW) ............................... 98123383 A

(51) Int. Cl.
*H04J 3/14* (2006.01)
(52) U.S. Cl.
USPC .......................................... 370/252; 370/250
(58) Field of Classification Search
USPC ..................................... 370/252, 248; 706/21
See application file for complete search history.

(56) References Cited

U.S. PATENT DOCUMENTS

| 6,560,584 B1 * | 5/2003 | Afshar et al. ................... 706/21 |
| 7,995,495 B2 * | 8/2011 | Lin ................................ 370/252 |
| 8,121,042 B2 * | 2/2012 | Wang et al. ................... 370/248 |
| 2009/0083014 A1 * | 3/2009 | Schallert ............................ 703/6 |

OTHER PUBLICATIONS

Lin, Yi-Kuei, Time Version of the Shortest Path Problem in a Stochastic-Flow Network, Journal of Computational Applied Mathematics, 228, 2009, 150-157, 2008 Elsevier B. V.

* cited by examiner

*Primary Examiner* — Albert T Chou
(74) *Attorney, Agent, or Firm* — Bacon & Thomas, PLLC

(57) ABSTRACT

A system reliability evaluation method for transmission by two minimal paths in time restriction is disclosed. The minimal path includes plural arcs between a start node and a terminal node in a flow network. The method includes the steps of providing a virtual network in a computer for simulating the flow network; inputting a transmission requirement and a time restriction; distributing the transmission requirement in a first minimal path and a second minimal path to make the first minimal path have a first throughput and the second minimal path have a second throughput; finding a plurality of feasible solutions satisfying the relation that the first throughput plus the second throughput equals the demand in the time restriction; finding a lower boundary vector by applying the comparative method; and computing a system reliability by applying set theory.

8 Claims, 3 Drawing Sheets

SYSTEM RELIABILITY EVALUATION METHOD FOR TRANSMISSION BY TWO MINIMAL PATHS IN TIME RESTRICTION

BACKGROUND OF THE INVENTION (1) Field of the Invention

The invention relates to a system reliability evaluation method for transmission by two minimal paths in time restriction, and especially relates to a system reliability evaluation method for transmission by two minimal paths of a stochastic-flow network in time restriction.

(2) Description of the Prior Art

With the diversification of the commodities and the information services, various kinds of the flow networks which value the transmission time, the flow and the budget has emerged, such as the computer system, the telecommunication system, the logistic system and the transportation system, etc. Hence, a time version of the shortest path problem, called the quickest path problem, is proposed in the fields of the information science, the operation research or the network planning. This problem is for finding a quickest path with the minimum transmission time to send a given amount of data from the start node to the terminal node. Since then, several variants of the quickest path problems are proposed: the constrained quickest path problem, the first k quickest paths problem, and all-pairs quickest path problem.

Two factors, the flow and the transmission time, are respectively processed in the conventional network analysis. For instance, the flow is processed in the maximum flow problem, the transmission time is processed to get the minimum transmission time in the shortest path problem. However, two factors, the transmission time and the flow, are simultaneously processed in the quickest path problem, and the transmission time is valued in the computer system and the telecommunication system.

Due to failure, partial failure, maintenance, etc., the capacity of each arc is stochastic in many real flow networks such as the computer, the telecommunication, the urban traffic, the logistics systems, etc. That is, each arc has several possible capacities or states. Such a network is named a stochastic-flow network. For instance, a computer system with the arcs denoting the transmission media and the nodes denoting stations of servers is a typical stochastic-flow network. In fact, each transmission medium is combined with several physical lines (the coaxial cables, the fiber optics, etc), and each physical line has only success or failure state. That implies a transmission medium has several states in which state k means k physical lines are successful.

Thus, in the computer network and the telecommunication network, the data can be transmitted through several disjoint minimal paths (MPs) simultaneously in order to reduce the transmission time and in several various factors, where a MP is an ordered sequence of arcs from the start node to the terminal node without loops. Namely, finding two MPs simultaneously transmitting data in time restriction is an important issue to conduct the system reliability evaluation method for a stochastic-flow network.

SUMMARY OF THE INVENTION

Accordingly, the object of the invention is to provide a system reliability evaluation method for transmission by two minimal paths in time restriction. With setting the restriction of the transmission time between a start node and a terminal node in a flow network, calculating the probability satisfied by the time restriction to evaluate the quality of service for customer.

In one aspect, the invention provides a system reliability evaluation method for transmission by two minimal paths in time restriction, using a computer executing a reliability evaluation software to evaluate a system reliability. The computer contains an input unit, an operation unit and an output unit. The reliability evaluation software provides a virtual network for simulating the flow network. The virtual network has a start node, a terminal node and plural arcs between the start node and the terminal node for constituting plural minimal paths.

The steps of said system reliability evaluation method include: inputting a transmission requirement and a time restriction from the input unit by users; distributing the transmission requirement in a first minimal path and a second minimal path of the minimal paths of the virtual network, and the first minimal path having a first throughput and the second minimal path having a second throughput; according to the time restriction, selecting a plurality of feasible solutions for satisfying the sum of the first throughput and the second throughput equaling to the transmission requirement; calculating a first minimal capacity of the first minimal path and a second minimal capacity of the second minimal path in the feasible solutions; defining a capacity vector composed by the capacities of the arcs, the capacities, which are corresponded with the flow distribution state of the first minimal capacity and the second minimal capacity, and which are defined as zero when the arcs of the first minimal path and the second minimal path are empty of the capacities; comparing the magnitudes of all the capacity vectors, and defining the minimum capacity vector as a lower boundary vector; according to the lower boundary vectors, calculating a system reliability of showing all the capacity vectors satisfying the transmission requirement and the time restriction by using the set theory; and displaying the system reliability on the output unit.

In another aspect, the steps of distributing the transmission requirement in the first minimal path and the second minimal path include: selecting the minimal paths of the virtual network, wherein each of the minimal paths is required to be an ordered sequence of the arcs from the start node to the terminal node without loops; calculating the minimal capacity in each of the minimal paths; and transferring the minimal capacity in each of the minimal paths into the current capacity in each of the arcs.

In yet another aspect, further including: providing a lead time for each of the arcs in the minimal paths; and calculating a transmission time equals to the sum of the lead time and the throughput divided by the minimal capacity in each of the minimal paths.

Said steps of calculating the system reliability is the inclusion-exclusion rule, the disjoint-event method or state-space decomposition.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
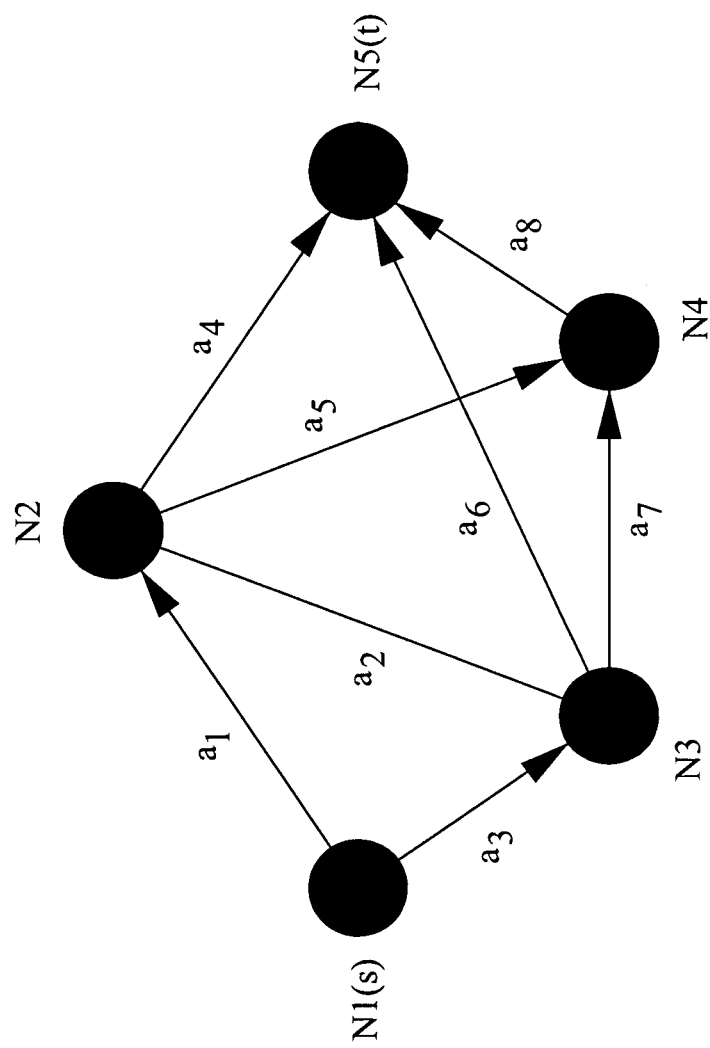
FIG. 1 is a schematic view of an embodiment of the virtual network.

Refer to FIG. 1 for a stochastic-flow network with a start node s and a terminal node t, where N stands for all nodes, $a_i$ for the i-th arc, each arc $a_i$ connecting two nodes N. The flow network can be an information network, a telecommunication network, a logistic network or a transportation network.

A system reliability evaluation method for transmission by a single minimal path, where the minimal path is required to be an ordered sequence of the arcs between the start node to the terminal node without loops, in time restriction is provide. The system reliability means the probability that the stochastic-flow network can send a specific amount of data from a single start node to a single terminal node by a single minimal path within a given time under a budget restriction. From the point of quality management, it is the probability of satisfying the transmission requirement in a specific time, which can be treated as a performance index of the service system.

For evaluating the system reliability of a real-life flow network, a computer is for running a reliability evaluation software which provides a network model for simulating the real-life flow network.

Figure 2:
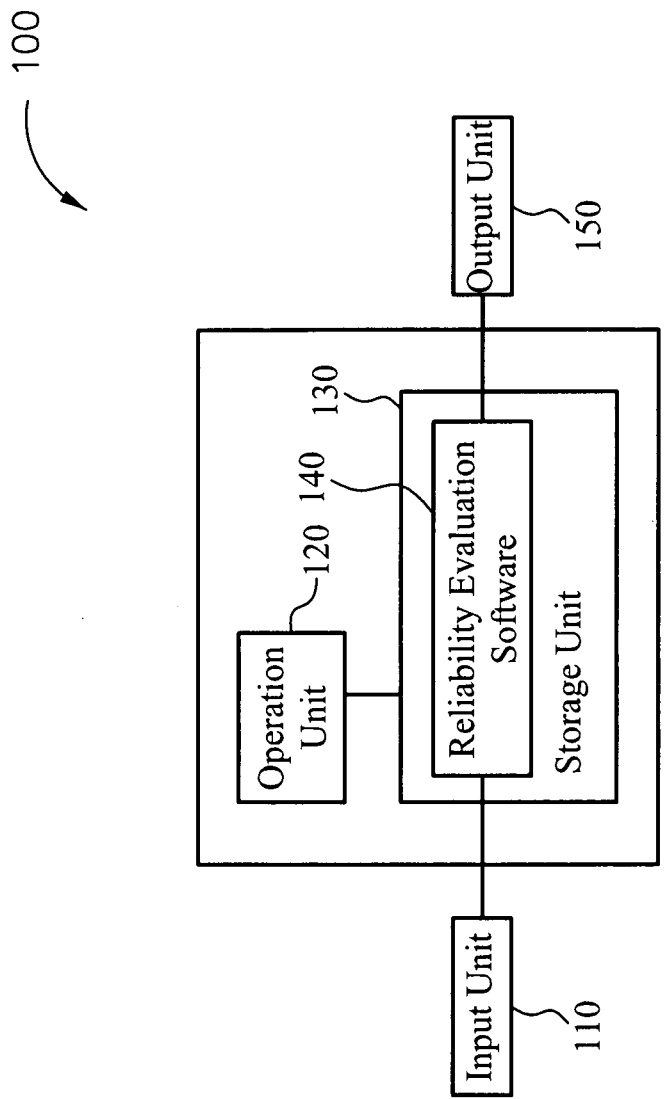
FIG. 2 is a block diagram of the hardware executing an embodiment of the system reliability evaluation method for transmission by two minimal paths in time restriction.

Refer to FIG. 2 for a block diagram of the hardware in the system reliability evaluation method for transmission by two minimal paths in time restriction. A computer 100 has an input unit 110, an operation unit 120, a storage unit 140 and an output unit 150. The input unit 110 is a keyboard or a hand-writing input device. The operation unit 120 is a central processing unit (CPU). The storage unit 140 is a hardware electrically connected to the input unit 110, the operation unit 120 and the output unit 150. A reliability evaluation software 130 is installed in the hardware. The output unit 150 is a display or a printer.

Figure 3:
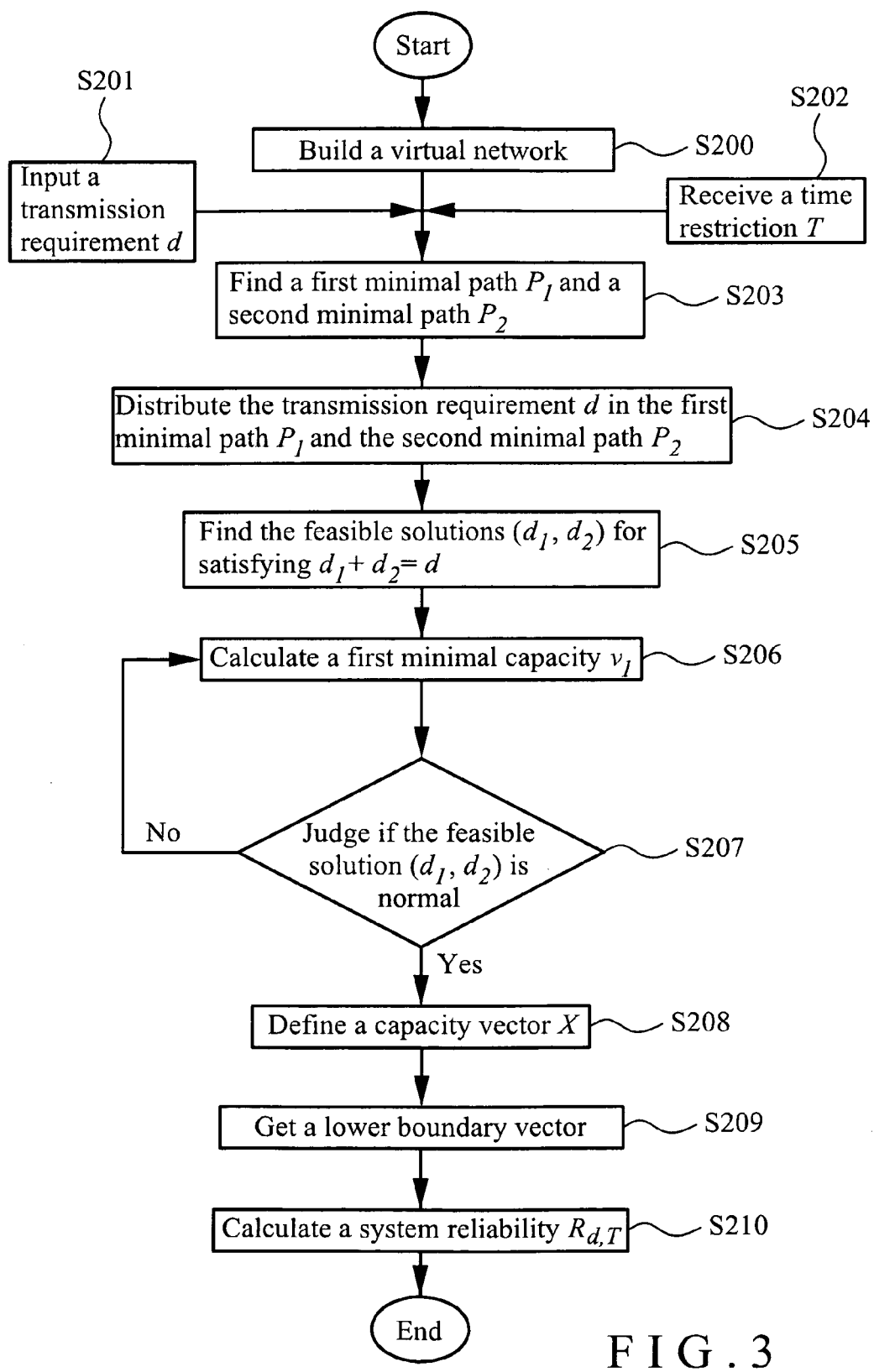
FIG. 3 is a flow chart of the software executing an embodiment of the system reliability evaluation method for transmission by two minimal paths in time restriction.

Refer to FIG. 3 for a flow chart of the system reliability software 140 executing the system reliability evaluation method for transmission by a single minimal path in time restriction. The method includes the steps of:

Step(S200) building a virtual network to correspond with the real-life flow network in the network model according to the numbers of the nodes N and the arcs $a_i$ in the real-life flow network.

Step(S201): inputting a transmission requirement d of goods, commodities or data from the input unit 110 by user.

Step(S202): receiving a time restriction T set by the user.

Step(S203): supposing that the network is a binary-state system, and each arc has two cases of normal and failure. All minimal paths $P_j = \{a_{j1}, a_{j2}, \ldots, a_{jn_j}\}$ between the start node s to the terminal node t in the virtual network are selected. In particular, the data are transmitted through two minimal paths simultaneously in order to reduce the transmission time. Meanly, the data are transmitted through a first minimal path $P_1 = \{a_1, a_2, \ldots, a_q\}$ and a second minimal path $P_2 = \{a_{q+1}, a_{q+2}, \ldots, a_{q+r}\}$ simultaneously.

Step(S204): distributing the transmission requirement d in the first minimal path $P_1$ and the second minimal path $P_2$ of the minimal paths of the virtual network between the start node s and the terminal node t, the first minimal path $P_1$ has a first throughput $d_1$ and the second minimal path $P_2$ has a second throughput $d_2$.

Step(S205): selecting a plurality of feasible solutions ($d_1$, $d_2$) for satisfying the sum of the first throughput $d_1$ and the second throughput $d_2$ equaling to the transmission requirement d.

Step(S206): in the light of the j-th feasible solution ($d_1$, $d_2$), respectively calculating a first minimal capacity $V_1$ of the first minimal path $P_1$ and a second minimal capacity $v_2$ of the second minimal path $P_2$ according to the time restriction T. According to the minimal capacity of each minimal path, a maximum throughput of each arc $a_i$ in a unit of time, such as the current capacity $x_i$ of each arc $a_i$, is calculated.

Step(S207): judge if the j-th feasible solution ($d_1$, $d_2$) is normal, that is, performing step(S208) when the first minimal capacity $v_1$ and the second minimal capacity $v_2$ can be calculated in step(S206); else if, executing step(S206) for the next feasible solution ($d_1$, $d_2$).

Step(S208): defining a capacity vector $X \equiv (x_1, x_2, \ldots, x_n)$ to represent the current state of all arcs. The capacity vector X is composed by the capacities, which are corresponded with the flow distribution state of the first minimal capacity and the second minimal capacity, and which are defined as zero when the arcs of the first minimal path and the second minimal path are empty of the capacities. The capacity vector X is composed by the capacities $x_1, x_2, \ldots, x_n$ of the arcs. The capacities are stochastic to correspond with the flow distribution of the flow network.

Step(S209): getting a lower boundary vector. The capacity vector X selected by the step(S208) is the candidate of the lower boundary vector, which makes the flow network satisfy the time restriction T. Any capacity vector larger than the lower boundary vector can satisfy the transmission requirement d sent in time less than or equal to the time restriction T. All the capacity vectors are compared to get the minimum capacity vector as the lower boundary vector, yet there are plural feasible solutions.

Step(S210): due to the lower boundary vectors of showing all the capacity vectors satisfying the transmission requirement and the time restriction by using the set theory, applying inclusion-exclusion rule, disjoint-event method or state-space decomposition to calculate the probability of the capacity vector X larger than or equal to the lower boundary vector, which is the probability that the flow network satisfies the transmission requirement d, called the system reliability, represented by $R_{d,T}$.

Additionally, an expectation of transmission ability of the flow network is defined as product of the system reliability $R_{d,T}$ and the transmission requirement d, and an expectation of the transmission time of the flow network is defined as product of the system reliability $R_{d,T}$ and the time restriction T. Thus, after calculating the system reliability $R_{d,T}$, $$\sum_d R_{d,T} \times d$$

is the expected transmission ability of the flow network and $$\sum_T R_{d,T} \times T$$

is the expected transmission time of sending d units of data under the time restriction T.

Refer to FIG. 1 for a benchmark network to illustrate the proposed algorithm. The algorithm and an preferred embodiment are presented in following text.

Let G≡(N, A, L, M) denotes a stochastic-flow network where N denotes the set of nodes, A≡$\{a_i | 1 \leq i \leq n\}$ denotes the set of arcs, L≡$(l_1, l_2, \ldots, l_n)$ with $l_i$ denoting the lead time of $a_i$, and M=$(M_1, M_2, \ldots, M_n)$ with $M_i$ denoting the maximum capacity of $a_i$. The capacity is the maximal number of data sent through the medium (one arc or one minimal path) per unit of time. In the stochastic-flow network, the current capacity of arc $a_i$ is stochastic, denoted by $x_i$, taking values $0 \equiv b_{i1} < b_{i2} < \ldots < b_{ir_i} = M_i$ where $b_{ij}$ is an integer for j=1, 2, ..., $r_i$ and $r_i$ is the number of states of $a_i$. The vector X≡$(x_1, x_2, \ldots, x_n)$ denotes the capacity vector.

If the flow in the flow network can satisfy the transmission requirement d, the time restriction and the capacity of the arcs smaller than the maximum capacity at the same time, the transmission of the flow network is defined as a success.

In this flow network, assuming each node N is perfectly reliable, the capacities of different arcs are statistically independent and all transmission requirement such as data and commodities are simultaneously sent through two minimal path. The comparisons of vectors are:

Y≧X$(y_1,y_2,\ldots,y_n)$≧$(x_1,x_2,\ldots,x_n)$:$y_i$≧$x_i$ for each i=1,2,...,n;

Y>X$(y_1,y_2,\ldots,y_n)$>$(x_1,x_2,\ldots,x_n)$:Y≧X and $y_i$>$x_i$ for at least one i;

Y+X$(y_1,y_2,\ldots,y_n)$+$(x_1,x_2,\ldots,x_n)$= $(y_1+x_1,y_2+x_2,\ldots,y_n+x_n)$; and Y−X$(y_1,y_2,\ldots,y_n)$−$(x_1,x_2,\ldots,x_n)$= $(y_1-x_1,y_2-x_2,\ldots,y_n-x_n)$.

Suppose that $P_1, P_2, \ldots, P_m$ are all the minimal paths of G with a start node s and a terminal node t. With respect to each minimal path $P_j = \{a_{j1}, a_{j2}, \ldots, a_{jn_j}\}$, j=1, 2, ..., m, the capacity of $P_j$ under the capacity vector X is $$\min_{1 \leq k \leq n_j} x_{jk}.$$

If d units of data are required to be transmitted through minimal path Pj under the capacity vector X, then the transmission time, denoted by $\psi(d,X,P_j)$, is lower than or equal to the time restriction and equals to the sum of the lead time and the transmission requirement divided by the minimal capacity of the minimal path $P_j$, represented by:

$$\text{lead time of } P_j + \left\lceil \frac{d}{\text{the minimal capacity of } P_j} \right\rceil = \sum_{k=1}^{n_j} l_{jk} + \left\lceil \frac{d}{\min_{1 \leq k \leq n_j} x_{jk}} \right\rceil,$$

where $\lceil x \rceil$ is the smallest integer such that $\lceil x \rceil \geq X$. $\psi(d,X,P_j)$ is an integer value. It contradicts the time constraint if $\psi(d,X,P_j)>T$. Thus, any capacity vector X with $\psi(d,X,P_j) \leq T$ means that the network can send d units of data from the start node s to the terminal node t within time restriction T under the capacity vector X. The following lemma holds the inequality $\psi(d,X,P_j) \geq \psi(d,Y,P_j)$ if X<Y.

Lemma 1.

If X<Y, then $x_{jk} \leq y_{jk}$ for each $a_{jk} \in P_j$, and $$\min_{1 \leq k \leq n_j} x_{jk} \leq \min_{1 \leq k \leq n_j} y_{jk}.$$

Thus, $\left\lceil \dfrac{d}{\min_{1 \leq k \leq n_j} x_{jk}} \right\rceil \geq \left\lceil \dfrac{d}{\min_{1 \leq k \leq n_j} y_{jk}} \right\rceil$. So $\psi(d, X, P_j) \geq \psi(d, Y, P_j)$.

Assume that the data are transmitted simultaneously through two disjoint minimal paths, the first minimal path $P_1$ and the second minimal path $P_2$. Let $d_1$ and $d_2$ be the throughputs assigned to $P_1$ and $P_2$. Let $\delta(d_1,d_2,X)$ denote the minimum transmission time to send $d_1$ and $d_2$ units of data under the capacity vector X, then $\delta(d_1,d_2,X) = \max\{\psi(d_1,X,P_1), \psi(d_2,X,P_2)\}$. Let $\xi(d,X)$ further denote the minimum transmission time to send d units of data through $P_1$ and $P_2$ under the capacity vector X, then $$\xi(d, X) = \min_{\text{all}(d_1,d_2):d_1+d_2=d} \{\delta(d_1, d_2, X)\}.$$

The system reliability $R_{d,T}$ is thus equal to $\Pr\{X | \xi(d,X) \leq T\}$. Any capacity vector X with $\xi(d,X) \leq T$ means that X can send d units of data from s to t under the time constraint T. Let Ω be the set of such X, and $\Omega_{min} \equiv \{X | X \text{ is minimal in } \Omega\}$. Then $X \in \Omega_{min}$ is called a (d,T)-MP. Equivalently, X is a (d,T)-MP if and only if (i) $\xi(d,X) \leq T$ and (ii) $\xi(d,Y)>T$ for any capacity vector Y with Y<X. The MP is a set of arcs while (d,T)-MP is a vector of arc capacities. Hence, the following lemma is held.

Lemma 2.

Since X is a (d,T)-MP, $\xi(d,X) \leq T$. If X is a (d,T)-MP, then Y∈Ω for any Y>X.

Lemma 1 states that $\psi(d,Y,P_j) \leq \psi(d,X,P_j)$ for any Y>X. Hence, $\max\{\psi(d_1,Y,P_1), \psi(d_2,Y,P_2)\} \leq \max\{\psi(d_1,X,P_1), \psi(d_2,X,P_2)\}$. That is, $$\delta(d_1,d_2,Y) \leq \delta(d_1,d_2,X);$$

$$\min_{\text{all}(d_1,d_2):d_1+d_2=d} \{\delta(d_1, d_2, X)\} \leq \min_{\text{all}(d_1,d_2):d_1+d_2=d} \{\delta(d_1, d_2, X)\}.$$

Y∈Ω is concluded by obtaining $\xi(d,Y) \leq \xi(d,X) \leq T$.

Lemma 2 implies that $\Pr\{X | \xi(d,X) \leq T\} = \Pr\{X | X \geq X_j \text{ for a (d,T)-MP } X_j\}$. Suppose there are b (d,T)-MPs, let $B_j = \{X | X \geq X_j\}$, j=1, 2, ..., b. Then $$R_{d,T} = \Pr\left\{\bigcup_{j=1}^{b} B_j\right\}.$$

Several methods such as inclusion-exclusion, disjoint-event method and state-space decomposition can be applied to calculate $$Pr\left\{\bigcup_{j=1}^{b} B_j\right\}.$$

The algorithm to evaluate the system reliability is as follows:

Step 1.

For the first minimal path $P_1=\{a_1, a_2, \ldots, a_q\}$ and the second minimal path $P_2=\{a_{q+1}, a_{q+2}, \ldots, a_{q+r}\}$, find the vector $X_j=(x_1, x_2, \ldots, x_n)$ such that the network sends d units of data within T units of time.

1. Find the largest assigned throughputs $$\min_{1\leq k\leq q}(M_k)$$

of $P_1$ and $$\min_{q+1\leq k\leq q+r}(M_k)$$

of $P_2$, thus $\overline{d_1}$ and $\overline{d_2}$ units of data respectively can be sent within T units of time. That is, find $\overline{d_1}$ and $\overline{d_2}$ such that $$\sum_{k=1}^{q}l_k + \left\lceil \frac{\overline{d_1}}{\min_{1\leq k\leq q} M_k}\right\rceil \leq T \text{ and} \quad (1)$$

$$\sum_{k=q+1}^{q+r}l_k + \left\lceil \frac{\overline{d_2}}{\min_{q+1\leq k\leq q+r} M_k}\right\rceil \leq T, \text{ respectively.} \quad (2)$$

2. Generate all non-negative integer solutions of $d_1+d_2=d$; in another word, the transmission requirement equals to the first throughput plus the second throughput, where $d_1 \leq \overline{d_1}$ and $d_2 \leq \overline{d_2}$.

Step 2.

For each solution $(d_1, d_2)$, check the feasibility, which that each minimal capacity of two minimal paths $P_1$ and $P_2$ satisfy the transmission requirement and is smaller than or equal to the maximum capacity of two minimal path, and two minimal paths satisfy the time restriction.

1. Find the minimal capacity $v_1$ of $P_1$ such that the first throughput $d_1$ units of data can be sent through $P_1$ under the time constraint. That is, find the smallest integer $v_1$ such that $$\sum_{k=1}^{q}l_k + \left\lceil \frac{d_1}{v_1}\right\rceil \leq T. \quad (3)$$

2. For $P_2$, find the smallest integer $v_2$ such that $$\sum_{k=q+1}^{q+r}l_k + \left\lceil \frac{d_2}{v_2}\right\rceil \leq T. \quad (4)$$

3. $j=j+1$. $X_j=(x_1, x_2, \ldots, x_n)$ is obtained according to $$x_i = \begin{cases} \text{minimal capacity } u \text{ of } a_i \text{ such that } u \geq v_1 & \text{if } a_i \in P_1 \cup P_2 \\ 0 & \text{if others.} \end{cases}$$

4. For k=1 to j−1, if $X_j \geq X_k$, then $X_j$ is not the lower boundary vector; if $X_j < X_k$, then delete $X_k$ from $\Omega_{min}$. Thus, $\Omega_{min} = \Omega_{min} \cup \{X_j\}$, and then next $(d_1, d_2)$.

Step 3.

If $X_j$ exists, then $B_j=\{X|X \geq X_j\}$; Otherwise, $B_j=\phi$. Then the system reliability is $$Pr\left\{\bigcup_{j=1}^{m} B_j\right\}.$$

The benchmark network in FIG. 1 illustrates the proposed algorithm. The capacity and the lead time of each arc are shown in Table 1. In the first embodiment, if 8 units of data are required to be sent through $P_1=\{a_1, a_4\}$ and $P_2=\{a_3, a_7, a_8\}$ under the time constraint 9, then all the lower boundary vectors (8,9)-MPs and the system reliability $R_{8,9}$ to meet such requirements can be derived as follows.

TABLE 1

The arc data of FIG. 1

| Arc | Capacity | Probability | Lead time |
|---|---|---|---|
| $a_1$ | 3* | 0.80 | 2 |
| | 2 | 0.10 | |
| | 1 | 0.05 | |
| | 0 | 0.05 | |
| $a_2$ | 3 | 0.80 | 1 |
| | 2 | 0.10 | |
| | 1 | 0.05 | |
| | 0 | 0.05 | |
| $a_3$ | 3 | 0.80 | 3 |
| | 2 | 0.10 | |
| | 1 | 0.05 | |
| | 0 | 0.05 | |
| $a_4$ | 1 | 0.90 | 3 |
| | 0 | 0.10 | |
| $a_5$ | 2 | 0.80 | 1 |
| | 1 | 0.10 | |
| | 0 | 0.10 | |
| $a_6$ | 4 | 0.60 | 2 |
| | 3 | 0.20 | |
| | 2 | 0.10 | |
| | 1 | 0.05 | |
| | 0 | 0.05 | |
| $a_7$ | 5 | 0.55 | 2 |
| | 4 | 0.10 | |
| | 3 | 0.10 | |
| | 2 | 0.10 | |
| | 1 | 0.10 | |
| | 0 | 0.05 | |
| $a_8$ | 4 | 0.70 | 1 |
| | 3 | 0.10 | |
| | 2 | 0.10 | |
| | 1 | 0.05 | |
| | 0 | 0.05 | |

*Pr{the capacity of a1 is 3} = 0.80.

Step 1:

1. The largest demand $\overline{d_1}$ such that $$(l_1 + l_4) + \left\lceil \frac{\overline{d_1}}{\min\{M_1, M_4\}} \right\rceil \leq 9 \text{ is } \overline{d_1} = 4.$$

The largest demand $\overline{d_2}$ such that $$(l_3 + l_7 + l_8) + \left\lceil \frac{\overline{d_2}}{\min\{M_3, M_7, M_8\}} \right\rceil \leq 9 \text{ is } \overline{d_2} = 9.$$

2. Generate all non-negative integer solutions of $d_1+d_2=d$ where $d_1 \leq \overline{d_1}$ and $d_2 \leq \overline{d_2}$. The feasible solutions are generated: $(d_1,d_2)=(4,4)$, $(d_1,d_2)=(3,5)$, $(d_1,d_2)=(2,6)$, $(d_1,d_2)=(1,7)$, $(d_1,d_2)=(0,8)$.

Step 2:

For $(d_1,d_2)=(4,4)$,

1. The lead time of $P_1$ is $l_1+l_4=5$. Then $v_1=1$ is the smallest integer such that $$\left(5 + \left\lceil \frac{4}{v_1} \right\rceil \right) \leq 9.$$

2. The lead time of $P_2$ is $l_3+l_7+l_8=6$. Then $v_2=2$ is the smallest integer such that $$\left(6 + \left\lceil \frac{4}{v_2} \right\rceil \right) \leq 9.$$

3. The capacity vectors are obtained:

$X_1=(x_1, x_2, x_3, x_4, x_5, x_6, x_7, x_8)=(1,0,2,1,0,0,2,2)$. The other can be deduced by analogy: $X_2=(1,0,2,1,0,0,2,2)$, $X_3=(1,0,2,1,0,0,2,2)$, $X_4=(1,0,3,1,0,0,3,3)$ and $X_5=(0,0,3,0,0,0,3,3)$.

4. Compared the above capacity vectors, $X_1=(1,0,2,1,0,0,2,2)$ and $X_5=(0,0,3,0,0,0,3,3)$ are the minimum capacity vectors, which are the lower boundary vectors.

Step 3:

Two (8,9)-MPs are generated: $X_1=(1,0,2,1,0,0,2,2)$ and $X_5=(0,0,3,0,0,0,3,3)$. Let $B_1=\{X|X \geq X_1\}$ and $B_5=\{X|X \geq X_5\}$, then the system reliability $R_{8,9}=Pr\{B_1 \cup B_5\}=0.5886675+0.48-0.4104=0.6582675$ by applying inclusion-exclusion. In the calculating process, $Pr\{B_1\}=Pr\{X \geq (1,0,2,1,0,0,2,2)\}=Pr\{x_1 \geq 1\} \times Pr\{x_2 \geq 0\} \times Pr\{x_3 \geq 2\} \times Pr\{x_4 \geq 1\} \times Pr\{x_5 \geq 0\} \times Pr\{x_6 \geq 0\} \times Pr\{x_7 \geq 2\} \times Pr\{x_8 \geq 2\}=0.95 \times 1 \times 0.9 \times 0.9 \times 1 \times 1 \times 0.85 \times 0.9=0.5886675,$ $Pr\{B_5\}=Pr\{X \geq (0,0,3,0,0,0,3,3)\}=Pr\{x_1 \geq 0\} \times Pr\{x_2 \geq 0\} \times Pr\{x_3 \geq 3\} \times Pr\{x_4 \geq 0\} \times Pr\{x_5 \geq 0\} \times Pr\{x_6 \geq 0\} \times Pr\{x_7 \geq 3\} \times Pr\{x_8 \geq 3\}=1 \times 1 \times 0.8 \times 1 \times 1 \times 1 \times 0.75 \times 0.8=0.48,$ $Pr\{B_1 \cup B_5\}=Pr\{(X \geq (1,0,2,1,0,0,2,2)) \cup (X \geq 0,0,3,0,0,0,3,3)\}= Pr\{X \geq (1,0,3,1,0,0,3,3)\}=0.4104.$

TABLE 2

Results of the first embodiment

| $(d_1, d_2)$ | $(v_1, v_2)$ | X | $X \in \Omega_{min}$? | Remark |
|---|---|---|---|---|
| (4, 4) | (1, 2) | $X_1 = (1, 0, 2, 1, 0, 0, 2, 2)$ | Yes | |
| (3, 5) | (1, 2) | $X_2 = (1, 0, 2, 1, 0, 0, 2, 2)$ | NO | $X_2 \geq X_1$ |
| (2, 6) | (1, 2) | $X_3 = (1, 0, 2, 1, 0, 0, 2, 2)$ | NO | $X_3 \geq X_1$ |
| (1, 7) | (1, 3) | $X_4 = (1, 0, 3, 1, 0, 0, 3, 3)$ | NO | $X_4 \geq X_1$ |
| (0, 8) | (0, 3) | $X_5 = (0, 0, 3, 0, 0, 0, 3, 3)$ | YES | |

In the second embodiment that T is loosened to be 11, the results are described in Table 3. Two (8,11)-MPs are generated: $X_1=(1,0,1,1,0,0,1,1)$ and $X_7=(0,0,2,0,0,0,2,2)$. The system reliability $R_{8,11}$ increases to 0.8328881225.

TABLE 3

Results of the second embodiment

| $(d_1, d_2)$ | $(v_1, v_2)$ | X | $X \in \Omega_{min}$? | Remark |
|---|---|---|---|---|
| (6, 2) | (1, 1) | $X_1 = (1, 0, 1, 1, 0, 0, 1, 1)$ | Yes | |
| (5, 3) | (1, 1) | $X_2 = (1, 0, 1, 1, 0, 0, 1, 1)$ | NO | $X_2 \geq X_1$ |
| (4, 4) | (1, 1) | $X_3 = (1, 0, 1, 1, 0, 0, 1, 1)$ | NO | $X_3 \geq X_1$ |
| (3, 5) | (1, 1) | $X_4 = (1, 0, 1, 1, 0, 0, 1, 1)$ | NO | $X_4 \geq X_1$ |
| (2, 6) | (1, 2) | $X_5 = (1, 0, 2, 1, 0, 0, 2, 2)$ | NO | $X_5 \geq X_1$ |
| (1, 7) | (1, 2) | $X_6 = (1, 0, 2, 1, 0, 0, 2, 2)$ | NO | $X_6 \geq X_1$ |
| (0, 8) | (0, 2) | $X_7 = (0, 0, 2, 0, 0, 0, 2, 2)$ | YES | |

A new arc data are shown in Table 4 where the possible capacity of each arc does not appear in consecutive integers. In the third embodiment, if 20 units of data are required to be sent through $P_1=\{a_1, a_4\}$ and $P_2=\{a_3, a_7, a_8\}$ under the time constraint 12, then the system reliability $R_{20,12}=0.78545625$. The calculation process and results are concluded in Table 5.

TABLE 4

New data for arcs

| Arc | Capacity | Probability | Lead time |
|---|---|---|---|
| $a_1$ | 5 | 0.85 | 2 |
| | 3 | 0.05 | |
| | 1 | 0.05 | |
| | 0 | 0.05 | |
| $a_2$ | 5 | 0.80 | 1 |
| | 3 | 0.10 | |
| | 1 | 0.05 | |
| | 0 | 0.05 | |
| $a_3$ | 6 | 0.80 | 3 |
| | 3 | 0.10 | |
| | 1 | 0.05 | |
| | 0 | 0.05 | |
| $a_4$ | 2 | 0.95 | 3 |
| | 0 | 0.05 | |
| $a_5$ | 3 | 0.90 | 1 |
| | 0 | 0.10 | |
| $a_6$ | 7 | 0.60 | 2 |
| | 5 | 0.20 | |
| | 3 | 0.10 | |
| | 1 | 0.05 | |
| | 0 | 0.05 | |
| $a_7$ | 9 | 0.70 | 2 |
| | 7 | 0.10 | |
| | 5 | 0.05 | |
| | 3 | 0.05 | |
| | 1 | 0.05 | |
| | 0 | 0.05 | |
| $a_8$ | 7 | 0.75 | 1 |
| | 5 | 0.10 | |
| | 3 | 0.05 | |
| | 1 | 0.05 | |
| | 0 | 0.05 | |

TABLE 5

Results of the third embodiment

| $(d_1, d_2)$ | $(v_1, v_2)$ | X | $X \in \Omega_{min}$? | Remark |
|---|---|---|---|---|
| (14, 6) | (2, 1) | $X_1 = (2, 0, 1, 2, 0, 0, 1, 1)$ | YES | |
| (13, 7) | (2, 2) | $X_2 = (2, 0, 2, 2, 0, 0, 2, 2)$ | NO | $X_2 \geq X_1$ |
| (12, 8) | (2, 2) | $X_3 = (2, 0, 2, 2, 0, 0, 2, 2)$ | NO | $X_3 \geq X_1$ |
| (11, 9) | (2, 2) | $X_4 = (2, 0, 2, 2, 0, 0, 2, 2)$ | NO | $X_4 \geq X_1$ |
| (10, 10) | (2, 2) | $X_5 = (2, 0, 2, 2, 0, 0, 2, 2)$ | NO | $X_5 \geq X_1$ |
| (9, 11) | (2, 2) | $X_6 = (2, 0, 2, 2, 0, 0, 2, 2)$ | NO | $X_6 \geq X_1$ |
| (8, 12) | (2, 2) | $X_7 = (2, 0, 2, 2, 0, 0, 2, 2)$ | NO | $X_7 \geq X_1$ |
| (7, 13) | (1, 3) | $X_8 = (1, 0, 3, 1, 0, 0, 3, 3)$ | YES | |
| (6, 14) | (1, 3) | $X_9 = (1, 0, 3, 1, 0, 0, 3, 3)$ | NO | $X_9 \geq X_8$ |
| (5, 15) | (1, 3) | $X_{10} = (1, 0, 3, 1, 0, 0, 3, 3)$ | NO | $X_{10} \geq X_8$ |
| (4, 16) | (1, 3) | $X_{11} = (1, 0, 3, 1, 0, 0, 3, 3)$ | NO | $X_{11} \geq X_8$ |
| (3, 17) | (1, 3) | $X_{12} = (1, 0, 3, 1, 0, 0, 3, 3)$ | NO | $X_{12} \geq X_8$ |
| (2, 18) | (1, 3) | $X_{13} = (1, 0, 3, 1, 0, 0, 3, 3)$ | NO | $X_{13} \geq X_8$ |
| (1, 19) | (1, 4) | $X_{14} = (1, 0, 4, 1, 0, 0, 4, 4)$ | NO | $X_{14} \geq X_8$ |
| (0, 20) | (0, 4) | $X_{15} = (0, 0, 4, 0, 0, 0, 4, 4)$ | YES | |

Take the data in Table 1. In the fourth embodiment as the first embodiment, if 8 units of data are required to be sent through $P_1=\{a_1, a_4\}$ and the alternative second minimal path $P_3=\{a_3, a_6\}$ under the time constraint 9, then the system reliability $R_{8,9}=0.8890875$. Therefore, if data are required to be sent through the alternative first minimal path $P_3=\{a_3, a_6\}$ and the alternative second minimal path $P_4=\{a_1, a_5, a_8\}$, then the system reliability $R_{8,9}=0.948313125$. The results shown in Table 6 indicate that different distributional ways are compared to get the optimal pair with highest system reliability.

TABLE 6

Results of all pairs of disjoint MPs in the 4th embodiment

| $P_1 = \{a_1, a_4\}$ and $P_2 = \{a_3, a_7, a_8\}$ | | | System reliability = 0.6582675 | |
| $P_3 = \{a_3, a_6\}$ and $P_4 = \{a_1, a_5, a_8\}$ | | | System reliability = 0.948313125 | |

| $(d_3, d_4)$ | $(v_3, v_4)$ | X | $X \in \Omega_{min}$? | Remark |
|---|---|---|---|---|
| (8, 0) | (2, 0) | $X_1 = $ (0, 0, 2, 0, 0, 2, 0, 0) | YES | |
| (7, 1) | (2, 1) | $X_2 = $ (1, 0, 2, 0, 1, 2, 0, 1) | NO | $X_2 \geq X_1$ |
| (6, 2) | (2, 1) | $X_3 = $ (1, 0, 2, 0, 1, 2, 0, 1) | NO | $X_3 \geq X_1$ |
| (5, 3) | (2, 1) | $X_4 = $ (1, 0, 2, 0, 1, 2, 0, 1) | NO | $X_4 \geq X_1$ |
| (4, 4) | (1, 1) | $X_5 = $ (1, 0, 1, 0, 1, 1, 0, 1) | YES | |
| (3, 5) | (1, 1) | $X_6 = $ (1, 0, 1, 0, 1, 1, 0, 1) | NO | $X_6 \geq X_5$ |
| (2, 6) | (1, 2) | $X_7 = $ (2, 0, 1, 0, 2, 1, 0, 2) | NO | $X_7 \geq X_5$ |
| (1, 7) | (1, 2) | $X_8 = $ (2, 0, 1, 0, 2, 1, 0, 2) | NO | $X_8 \geq X_5$ |
| (0, 8) | (0, 2) | $X_9 = $ (2, 0, 0, 0, 2, 0, 0, 2) | YES | |

| $P_1 = \{a_1, a_4\}$ and $P_3 = \{a_3, a_6\}$ | | | System reliability = 0.8890875 | |

| $(d_1, d_3)$ | $(v_1, v_3)$ | X | $X \in \Omega_{min}$? | Remark |
|---|---|---|---|---|
| (4, 4) | (1, 1) | $X_1 = $ (1, 0, 1, 1, 0, 1, 0, 0) | YES | |
| (3, 5) | (1, 2) | $X_2 = $ (1, 0, 2, 1, 0, 2, 0, 0) | NO | $X_2 \geq X_1$ |
| (2, 6) | (1, 2) | $X_3 = $ (1, 0, 2, 1, 0, 2, 0, 0) | NO | $X_3 \geq X_1$ |
| (1, 7) | (1, 2) | $X_4 = $ (1, 0, 2, 1, 0, 2, 0, 0) | NO | $X_4 \geq X_1$ |
| (0, 8) | (0, 2) | $X_5 = $ (0, 0, 2, 0, 0, 2, 0, 0) | YES | |

However, the computational complexity of the algorithm is analyzed as follows.

1. It takes at most O(n) time to find the largest assigned demands $\overline{d_1}$ and $\overline{d_2}$.

2. There are at most (d+1) solution of $d_1+d_2=d$. For each $(d_1,d_2)$, it spends O(n) time to test time constraint and to transform to X. The set $\Omega_{min}$ contains at most (d+1) elements. Hence, each $X_j$ needs O(dn) time to compare with other X in the worst case.

3. Needs $O(d^2n)$ time to generate all (d,T)-MPs.

In sum, it takes at most $O(d^2n)$ time to execute the proposed algorithm. Hence, the computational time is linear with respect to the number of arcs and the square of the transmission requirement. It seems that O(10000n) is needed if d=100. In practice, the transmission requirement d=100 is divided to be $(d_1,d_2)$=(100,0), (90,10), (80,20), (70,30), (60,40), (50,50), (40,60), (30,70), (20,80), (10,90), and (0,100). The number of feasible $(d_1,d_2)$ is 11 but not 101. Thus, only O(100n) time is needed. The complexity of the proposed algorithm is $O(\lambda^2 n)$ where $\lambda$ is the number of feasible $(d_1,d_2)$.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A system reliability evaluation method for transmission by two minimal paths in time restriction, using a computer including an input unit, an operation unit, a storage unit and an output unit electrically connected with each other, the computer executing a reliability evaluation software which provides a virtual network for simulating a flow network, the virtual network having a start node, a terminal node and plural arcs between the start node and the terminal node for constituting plural minimal paths, the method comprising the steps of:

storing the reliability evaluation software in the storage unit;

the input unit receiving a transmission requirement and a time restriction inputted by users, wherein the transmission requirement is data sent through the virtual network;

defining a transmission time as a time for sending the transmission requirement from the start node to the terminal node, the transmission time being lower than or equal to the time restriction in the reliability evaluation software;

defining each of the minimal paths as an ordered sequence of the arcs from the start node to the terminal node without loops in the virtual network of the reliability evaluation software;

defining the transmission requirement as being divided into a first throughput and a second throughput, wherein the minimal paths of the virtual network include a first minimal path and a second minimal path predetermined in the reliability evaluation software, wherein the first throughput is variable and sent through the first minimal path, and the second throughput is variable and sent through the second minimal path;

the operation unit calculating a plurality of combinations of the first throughput and the second throughput according to the sum of the first throughput and the second throughput equaling to the transmission requirement, and selecting a plurality of feasible solutions from the combinations according to the time for respectively sending the first throughput and the second throughput lower than or equal to the time restriction;

the operation unit calculating a first minimal capacity of the first minimal path according to the first throughput and an operation relation that the time for sending the first throughput is lower than or equal to the time restriction, and the operation unit calculating a second minimal capacity of the second minimal path according to the second throughput and an operation relation that the time for sending the second throughput is lower than or equal to the time restriction;

defining a capacity vector composed by the capacities of the arcs, the capacities, which are corresponded with the flow distribution state of the first minimal capacity and the second minimal capacity, and the capacities of the arcs are defined as zero when the arcs of the first minimal path and the second minimal path are empty of the capacities, wherein each of the capacities is defined as a maximum throughput sent through one of the arcs in a unit of time;

the operation unit comparing the magnitudes of all the capacity vectors for defining the minimum capacity vector as a lower boundary vector;

according to the lower boundary vectors, the operation unit calculating a system reliability of showing all the capacity vectors satisfying the transmission requirement and the time restriction by using the set theory; and displaying the system reliability on the output unit.

2. The system reliability evaluation method for transmission by two minimal paths in time restriction of claim 1, wherein the steps of defining the transmission requirement as being divided into the first throughput sent through the first minimal path and the second throughput sent through the second minimal path comprise:

the operation unit calculating the minimal capacity for each of the minimal paths; and transferring the minimal capacity for each of the minimal paths into the current capacity for each of the arcs.

3. The system reliability evaluation method for transmission by two minimal paths in time restriction of claim 1, wherein the step of defining the capacity vector comprises:

the operation unit judging if the minimal capacities of the two minimal paths are both smaller than or equal to a maximum capacity of the arcs in the two minimal paths, in order to judge if the capacity vectors corresponding to the two minimal paths exist.

4. The system reliability evaluation method for transmission by two minimal paths in time restriction of claim 1, further comprising:

defining a first lead time as a time for a data sent through one of the arcs of the first minimal path;

the operation unit calculating the first minimal capacity by an operation relation as the sum of the first lead times plus the result of the first throughput divided by the first minimal capacity is smaller than or equal to the time restriction;

defining a second lead time as a time for a data sent through one of the arcs of the second minimal path; and the operation unit calculating the second minimal capacity by an operation relation as the sum of the second lead times plus the result of the second throughput divided by the second minimal capacity is smaller than or equal to the time restriction.

5. The system reliability evaluation method for transmission by two minimal paths in time restriction of claim 1, wherein inclusion-exclusion rule, disjoint-event method or state-space decomposition is applied in the step of the operation unit calculating the system reliability.

6. The system reliability evaluation method for transmission by two minimal paths in time restriction of claim 1, further comprising: the operation unit calculating an expectation of the transmission ability of the flow network by product of the system reliability and the transmission requirement.

7. The system reliability evaluation method for transmission by two minimal paths in time restriction of claim 1, further comprising: the operation unit calculating an expectation of the transmission time of the flow network by product of the system reliability and the time restriction.

8. A non-transitory computer readable medium having instructions for a system reliability evaluation method for transmission by two minimal paths in time restriction, the instructions being executed on a computer including an input unit, an operation unit, a storage unit and an output unit electrically connected with each other, the instructions being included in a reliability evaluation software which provides a virtual network for simulating a flow network, the virtual network having a start node, a terminal node and plural arcs between the start node and the terminal node for constituting plural minimal paths, the method comprising the steps of:

sending a transmission requirement and a time restriction inputted by users to the input unit, wherein the transmission requirement is data sent through the virtual network;

defining a transmission time as a time for sending the transmission requirement from the start node to the terminal node, the transmission time being lower than or equal to the time restriction in the reliability evaluation software;

defining each of the minimal paths as an ordered sequence of the arcs from the start node to the terminal node without loops in the virtual network of the reliability evaluation software;

defining the transmission requirement as being divided into a first throughput and a second throughput, wherein the minimal paths of the virtual network include a first minimal path and a second minimal path predetermined in the reliability evaluation software, wherein the first throughput is variable and sent through the first minimal path, and the second throughput is variable and sent through the second minimal path;

the operation unit calculating a plurality of combinations of the first throughput and the second throughput according to the sum of the first throughput and the second throughput equaling to the transmission requirement, and selecting a plurality of feasible solutions from the combinations according to the time for respectively sending the first throughput and the second throughput lower than or equal to the time restriction;

the operation unit calculating a first minimal capacity of the first minimal path according to the first throughput and an operation relation that the time for sending the first throughput is lower than or equal to the time restriction, and the operation unit calculating a second minimal capacity of the second minimal path according to the second throughput and an operation relation that the time for sending the second throughput is lower than or equal to the time restriction;

defining a capacity vector composed by the capacities of the arcs, the capacities, which are corresponded with the flow distribution state of the first minimal capacity and the second minimal capacity, and the capacities of the arcs are defined as zero when the arcs of the first minimal path and the second minimal path are empty of the capacities, wherein each of the capacities is defined as a maximum throughput sent through one of the arcs in a unit of time;

the operation unit comparing the magnitudes of all the capacity vectors for defining the minimum capacity vector as a lower boundary vector;

according to the lower boundary vectors, the operation unit calculating a system reliability of showing all the capacity vectors satisfying the transmission requirement and the time restriction by using the set theory; and displaying the system reliability on the output unit.

\* \* \* \* \*